United States Patent
Clark et al.

[11] 3,905,960
[45] Sept. 16, 1975

[54] CRYSTALLINE ANHYDROUS PENICILLINS AND PREPARATION THEREOF

[75] Inventors: Dennis E. Clark, Basking Ridge; William J. Kerr, Somerville, both of N.J.

[73] Assignee: Beecham, Inc., Great Britain

[22] Filed: Sept. 30, 1971

[21] Appl. No.: 185,266

Related U.S. Application Data

[63] Continuation-in-part of Ser. No. 82,951, Oct. 22, 1970, abandoned.

[52] U.S. Cl. .......................... 260/239.1; 424/271
[51] Int. Cl. ............................................ C07d 99/16
[58] Field of Search ................................. 260/239.1

[56] References Cited
UNITED STATES PATENTS

| | | | |
|---|---|---|---|
| 3,142,673 | 7/1964 | Hobbs | 260/239.1 |
| 3,282,926 | 11/1966 | Brain et al. | 260/239.1 |
| 3,553,201 | 1/1971 | Clark et al. | 260/239.1 |
| 3,676,427 | 7/1972 | O'Shea et al. | 260/239.1 |
| 3,681,342 | 8/1972 | Butler et al. | 260/239.1 |
| 3,686,168 | 8/1972 | Timreck | 260/239.1 |
| 3,697,506 | 10/1972 | Butler | 260/239.1 |

FOREIGN PATENTS OR APPLICATIONS 980,240  1/1965  United Kingdom............. 260/239.1

*Primary Examiner*—Nicholas S. Rizzo

[57] ABSTRACT

A crystalline anhydrous disodium penicillin salt of the formula:

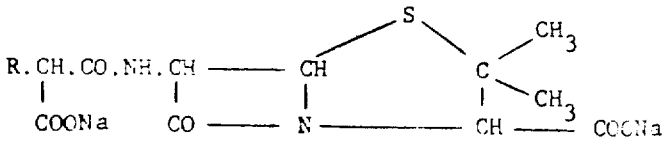

wherein R is phenyl or thienyl, is prepared in new anhydrous form characterized by purity, stability, reduced hygroscopicity and potency. The new anhydrous form is precipitated from an organic solvent with the sodium salt of a lower aliphatic carboxylic acid and isolated and purified by reslurrying in an organic solvent at an elevated temperature below the boiling point of the solvent.

13 Claims, 5 Drawing Figures

SODIUM CARBENICILLIN PRECIPITATED MOISTURE 1.0%

FIG.1

SODIUM CARBENICILLIN SPRAY DRIED MOISTURE 5.0%

FIG. 2

SODIUM CARBENICILLIN PRECIPITATED MOISTURE 1.0%

CRYSTALLINE ANHYDROUS PENICILLINS AND PREPARATION THEREOF

This application is a continuation in part of our copending application Ser. No. 82,951 filed Oct. 22, 1970, now abandoned.

The present invention relates to a new and superior form of disodium carbenicillin and α-carboxy-3-thienylmethyl penicillin characterized by increased purity, stability and potency, by reduced hygroscopicity and by being anhydrous. As used herein, the term anhydrous includes up to but not materially in excess of 1.50% moisture content for disodium carbenicillin and up to 2 to 2.5% moisture for the thienyl compound. The disodium penicillins are known and respond to the formula:

(I)

wherein R is phenyl or thienyl.

Carbenicillin and its disodium salt (R=phenyl) are generally covered but not specifically disclosed in U.S. Pat. No. 3,142,673. The free acid form of carbenicillin is disclosed in U.S. Pat. No. 3,282,926 and has been made via the carbenicillin intermediate α-(benzyloxycarbonyl)benzylpenicillin and its sodium salt according to U.S. Pat. No. 3,492,192. U.S. Pat. No. 3,282,926 also discloses and claims α-carboxy-3-thienylmethyl penicillin in its regular form.

Disodium carbenicillin which is sold as PYOPEN in Great Britain is a relatively new broadspectrum, semisynthetic penicillin of considerable clinical value, especially for the treatment of Pseudomonas and Proteus infections. It is isolated as a sterile powder suitable for reconstitution with sterile water for injection or other acceptable intravenous fluids and generally administered intravenously or intramuscularly. For Pseudomonas and Proteus infections particularly, the recommended treatment requires parenteral administration of large daily doses exceeding 20 gms./day. The present commercial methods for the isolation of disodium carbenicillin use spray-drying or lyophilization techniques which afford products having a poorly defined crystalline form, as indicated microscopically and by infrared spectroscopy. These products also possess undesirably high moisture contents in the range of 3.0 to 6.0% leading to poor stability upon long term storage or at elevated temperatures. A further disadvantage of the spraydrying and lyophilization techniques is the frequent presence of a considerable excess of sodium salts. The nature of these, of course, varies according to the chemical and extraction procedures preceding the final stages of production and isolation, but sodium salts of penicilloic acid, sodium phenylacetate and sodium carbonate have been identified as being present. The presence of sodium carbonate arises, for example, from extraction of the product from a rich organic phase with sodium carbonate, bicarbonate or hydroxide and this technique, which is fundamental to the spray-drying and lyophilization routes, often produces a product having a high pH value and characteristics unsuitable for parenteral use. Additionally, the maintenance of sterility in products isolated by spraydrying methods is difficult and often unsatisfactory. The known techniques are also expensive and require a large capital investment with relation to the commercial output or production level.

Similar considerations apply to α-carboxy-3-thienylmethyl penicillin (R=thienyl in formula (I)) and particularly with respect to moisture content. When the compound (R=thienyl) is made by a process involving, for example, normal spray drying the moisture content is in the range of 4 to 5%, whereas when it is made by a process involving reslurrying at elevated temperature similarly to carbenicillin (R=phenyl), the moisture content does not exceed approximately 2% and can be kept in the range of 2 to 2.5% while still being anhydrous and crystalline. The compound (R=thienyl) can be made with a moisture content below 2% and as low as 1.5% by special dehydration procedures or techniques but such is not essential since a moisture content of 2 to 2.5% has been found to be quite satisfactory. Its I.R. spectrum shows a sharpened peak as does the I.R. spectrum for precipitated carbenicillin. As will be apparent hereinafter, the anhydrous thienyl compound can be made in a yield of about 80% and an alkalimetric purity of at least 90% from a variety of ester starting materials such as the α-benzyl, α-phenyl or tert.-butyl ester.

The present invention is free from the above-named and other disadvantages, and the unique procedure described herein leads to the isolation of an anhydrous form of disodium carbenicillin and α-carboxy-3-thienylmethyl penicillin sodium salt which cannot be produced by the usual lyophilization or spray-drying methods. Comparisons of the physical data of the new anhydrous products with those of spray-dried and lyophilized disodium carbenicillin and thienyl sodium salt clearly demonstrate their differing natures, e.g., X-ray diffraction, infrared spectroscopy, thermogravimetric analysis and moisture content.

The new anhydrous crystalline forms are clearly defined by certain bands in the infrared spectrum and those of spray-dried and lyophilized material are included for comparison in the accompanying drawings wherein.

The uniqueness of the anhydrous forms, which are exceptionally pure and less hygroscopic, may be further demonstrated by comparison of the stability of the product under accelerated storage conditions. For example, at a temperature of 60°C. spray-dried carbenicillin exhibits marked instability which increases with increasing moisture content. Precipitated anhydrous carbenicillin under the same conditions shows little or no degradation. While the precipitation of penicillins from organic solvents is well known and is usually the preferred method of isolation, application of these methods to the precipitation of disodium carbenicillin does not result in a pharmaceutically acceptable product. More particularly, the product is often obtained as a very poor crystalline form or gel and is heavily contaminated with solvent. A product of poor color, low purity, low pH and which exists as a mixture of the mono-sodium and disodium salts generally results from these procedures even when carried out by those skilled in the art. The use of excess precipitating agent does not eliminate the presence of mono-sodium salt from the product as might be expected. In fact, the quality and stability of the product isolated by such a procedure often has inferior antibiotic potency, color and solubility characteristics.

The reslurrying of crude product in a suitable solvent at an elevated temperature is an essential part of this invention since it causes a visible change in the form of the product and converts mono-sodium salt to disodium salt. In addition, it has the very important function of removing impurities such as degradation products, solvent and precipitant from the disodium carbenicillin. Reslurrying at lower temperatures, e.g., room temperature, accomplishes none of these highly desirable features and the resulting product is pharmaceutically unsuitable, especially for parenteral use. Representative and comparative results are set forth in Table 1 and 2 which follow:

TABLE I

DISODIUM CARBENICILLIN - STABILITY DATA*

| Batch | INITIAL Potency | pH | %H₂O | TEMP. °C. | 1 WEEK Potency | 2 WEEKS Potency | 3 WEEKS Potency | 4 WEEKS Potency | 5 WEEKS Potency | 6 WEEKS Potency | PERCENT DECOMP. |
|---|---|---|---|---|---|---|---|---|---|---|---|
| 1 | 82.14 | 7.0 | 1.02 | 60 | 83.00 | 82.57 | 80.72 | 84.21 | — | — | Nil |
|   |       |     |      | 45 | 82.02 | 82.88 | 80.39 | 80.92 | 84.20 | 82.73 | Nil |
| 2 | 80.36 | 6.0 | 1.07 | 60 | 81.04 | 81.19 | 79.74 | 80.04 | — | — | 0.37 |
|   |       |     |      | 45 | 80.51 | 80.81 | 79.11 | 80.23 | 78.84 | 80.48 | Nil |
| 3 | 80.67 | 6.8 | 1.08 | 60 | 82.06 | 78.98 | 81.71 | 81.25 | — | — | Nil |
|   |       |     |      | 45 | 81.93 | 76.52 | 80.07 | 80.82 | 80.97 | 82.19 | Nil |
| 4 | 80.52 | 5.5 | 0.89 | 60 | 80.00 | 78.23 | 78.71 | 78.17 | — | — | 2.92 |
|   |       |     |      | 45 | 80.79 | 78.91 | — | 78.29 | — | 79.95 | 0.71 |
| 5 | 80.82 | 6.65 | 1.40 | 60 | 76.17 | 78.11 | — | 78.06 | — | — | 3.41 |
|   |       |     |      | 45 | — | 81.75 | — | 79.99 | — | 83.46 | Nil |
| 6 | 80.54 | 7.3 | 2.25 | 60 | 76.67 | 74.79 | 74.20 | 74.98 | — | — | 6.90 |
|   |       |     |      | 45 | — | 74.24 | — | 76.11 | — | 78.16 | 2.95 |
| 7 | 83.19 |     | 1.69 | 60 | — | 79.62 | — | 76.39 | — | — | 8.17 |
|   |       |     |      | 45 | — | 80.54 | — | 78.50 | — | 81.21 | 2.38 |
| 8 | 77.74 | 6.24 | 1.14 | 60 | 78.08 | 75.25 | 79.39 | 78.83 | — | — | Nil |
|   |       |     |      | 45 | — | 79.22 | 80.95 | 79.11 | 75.85 | 77.32 | 0.54 |
| 9 | 86.63 |     | 1.31 | 60 | 86.93 | 87.79 | 85.43 | 83.44 | — | — | 3.68 |
|   |       |     |      | 45 | — | 85.71 | — | — | — | — | — |

Potency calculated on an anhydrous basis:
pH - 1.0% solution
%H₂O - Karl Fischer Method

TABLE II

CARBENICILLIN SPRAY-DRIED - STABILITY DATA

| BATCH | TESTING | INITIAL POTENCY | %H₂O | FINAL POTENCY | %H₂O | PERCENT DECOMPOSITION |
|---|---|---|---|---|---|---|
| 1 | 4 wks./60°C. | 77.8 | 5.0 | 67.5 | 5.28 | 13.2 |
| 2 | 4 wks./60°C. | 77.9 | 4.95 | 57.3 | 5.14 | 26.4 |
| 3 | 4 wks./60°C. | 76.8 | — | 63.8 | 4.01 | 16.93 |
| 4 | 4 wks./60°C. | 77.2 | 5.43 | 63.5 | 4.92 | 17.75 |
| 5 | 4 wks./60°C. | 79.0 | 4.60 | 67.8 | 4.14 | 14.17 |
| 6 | 4 wks./60°C. | 81.5 | 4.14 | 65.4 | 4.45 | 19.75 |
| 7 | 4 wks./60°C. | 77.6 | — | 58.8 | 5.21 | 24.22 |
| 8 | 6 wks./45°C. | 77.0 | — | 65.6 | 5.89 | 14.81 |
| 9 | 6 wks./45°C. | 78.9 | 6.35 | 74.0 | 5.26 | 6.21 |
| 10 | 6 wks./45°C. | 77.81 | 7.03 | 72.7 | 4.72 | 6.57 |
| 11 | 6 wks./45°C. | 78.15 | 6.35 | 72.0 | 4.88 | 5.14 |
| 12 | 6 wks./45°C. | 75.66 | 5.60 | 68.9 | 4.59 | 8.93 |
| 13 | 6 wks./45°C. | 74.31 | 6.34 | 65.7 | 4.83 | 11.59 |
| 14 | 6 wks./45°C. | 78.64 | 6.98 | 69.0 | 6.39 | 12.26 |
| 14 | 4 wks./60°C. | 78.64 | 6.98 | 62.1 | 5.75 | 21.03 |
| 15 | 6 wks./45°C. | 78.16 | 6.16 | 70.5 | 5.94 | 10.38 |
| 15 | 4 wks./60°C. | 78.16 | 6.15 | 65.0 | 5.40 | 16.83 |

The process of the invention can be applied to carbenicillin prepared by several different methods, e.g., hydrogenolysis of a suitable carbenicillin ester, or aqueous hydrolysis of esters of carbenicillin, e.g., mono-or di-esters of benzyl and ethyl alcohols and phenols, or enzymatic cleavage of these esters; or spray-dried or lyophilized material or material made by any other known process. By any of the above procedures the produced penicillin is then extracted into a suitable water-immiscible solvent at acid pH, and subsequently precipitated with a basic sodium salt. Such sodium salts include, for example, those of lower alcohols, phenols, aliphatic and aromatic carboxylic acids, and also sodioderivatives of organic compounds containing an active methylene group, e.g., acetoacetic esters, malonic esters, etc. The precipitated crude sodium salt of carbenicillin is then slurried at a temperature in the range of 40° to 85°C., preferably in the range of 60° to 85°C. with a lower aliphatic alcohol until the conversion is judged to be complete. This temperature range is critical and if exceeded results in an unacceptable product not in conformity with the invention.

The invention is further illustrated by the following non-limitative examples.

EXAMPLE 1

40 Gms. of the benzyl ester of carbenicillin and 40 gms. of dibasic potassium phosphate are dissolved in 1 liter of water. Over 30 minutes 80 mls. of 1N sodium hydroxide are added and the mixture is held at 15°C. for 2.5 hours. After the hydrolysis the solution is cooled to 0°–5°C. and extracted with (methyl isobutyl ketone) MIBK (2 × 200 ml.) at pH 4.6 and then acidified to pH 2.2 and re-extracted with MIBK (1 × 275; 1 × 50 ml.). The combined extracts are dried over magnesium sulfate and the moisture level is adjusted to 1.4%. A 2N solution of sodium ethyl hexoate is added over 1 hour and the precipitate is collected, reslurried in hot butanol (82°), and dried overnight at 70°C. The yield of disodium carbenicillin was 45% of theory with biological potency of 83% (anhydrous free acid basis) using Pseudomonas aeruginosa as the test organism. Moisture content 0.9% (Karl Fischer).

EXAMPLE 2

A similar hydrolysis to that described in Example 1 was extracted. The extractions with isobutyl acetate afforded disodium carbenicillin in 58% yield and purity of 89.3%.

EXAMPLE 3

A similar hydrolysis extraction and precipitation to that described in Example 1 gave crude product which was reslurried in hot isopropyl alcohol at 82°C. to give disodium carbenicillin in 55.7% yield and an anhydrous assay of 87.3%.

EXAMPLE 4

By substituting refluxing acetone as the reslurry solvent in Example 1 anhydrous carbenicillin assaying at 81.4% (free acid) was obtained in 61.5% yield.

EXAMPLE 5

The use of n-propanol at 60°C. as a reslurry solvent in the experiment described in Example 1 afforded disodium carbenicillin in 52% yield of 81.5% purity (free acid basis).

EXAMPLE 6

Reslurry of crude disodium carbenicillin prepared as described in Example 1 in isopropyl alcohol at 40°C. gave anhydrous disodium carbenicillin in 53% yield.

EXAMPLE 7

Substitution of tertiary butanol for n-butanol in Example 1 afforded disodium carbenicillin of similar purity and yield.

EXAMPLE 8

Substitution of a sodium methoxide solution in isopropyl alcohol/methylene dichloride (1:1) as the precipitant in Example 1 gave disodium carbenicillin in 75% yield.

EXAMPLE 9

By changing the precipitant in Example 1 to a solution of sodium n-butoxide in butanol disodium carbenicillin was isolated in 40% yield.

EXAMPLE 10

Substitution of n-butanol for MIBK extractions in Example 1 gave 49% yield of 78.2% purity (anhydrous free acid) with a moisture content of 0.9%.

EXAMPLE 11

Substitution of isobutanol for MIBK extractions in Example 1 afforded a 51% yield of disodium carbenicillin with a purity of 84.8%.

EXAMPLE 12

Substitution of secondary butyl alcohol for MIBK extractions in Example 1 afforded a 47% yield of 81.3% purity carbenicillin (free acid basis).

EXAMPLE 13

The use of a 2N sodium ethyl butyrate solution in MIBK as the precipitating agent in Example 1 allowed the isolation of disodium carbenicillin in a 34% yield and purity of 79.4% (free acid basis).

EXAMPLE 14

Ethyl acetate was substituted for MIBK in Example 1 and afforded carbenicillin of 90% purity (as the disodium salt) in a 49% yield.

EXAMPLE 15

40 Gms. of the benzyl ester of carbenicillin and 40 gms. of dibasic potassium phosphate were dissolved in 1 liter of water. Over 30 minutes 80 mls. of 1N sodium hydroxide were added. The mixture is hydrolyzed at 15°C. and then cooled to 0°–5°C. and extracted with MIBK (2 × 200 mls.) at pH 4.6. Acidification to pH 2.2 and re-extraction with MIBK (1 × 275; 1 × 50 mls.) gave combined extracted which were dried over magnesium sulfate. A 2N solution of sodium ethyl hexanoate is added over 1 hour until one equivalent of sodium has been added. The precipitate is collected, reslurried in acetone at room temperature and dried at 35°C. The product was 96% pure as monosodium carbenicillin.

60 Gms. of the monosodium carbenicillin were dissolved in water by adjusting the pH to 5.0 with 2N NaOH. The solution was extracted at pH 2.2 with MIBK (1 × 700, 1 × 100). The bulked MIBK was dried over magnesium sulfate. A 2N solution of sodium ethyl hexanoate was added over 1 hour and the precipitate collected, reslurried in hot butanol (82°) and dried for 17 hours at 70°C. The yield was 79% with a purity of 87.5% (free acid anhydrous basis).

EXAMPLE 16

100 mg of 5% palladium on calcium carbonate was prehydrogenated in 1000 mls of water for one-half hour. A solution of 100 mg of the α-benzyl ester of carbenicillin in 1000 mls of water was added and hydrogenated for 1½ hours. The solution was filtered, cooled to 0°–5°C and extracted with 1100 mls of methyl isobutyl ketone (M.I.B.K.) at pH 2.0 using 2N sulphuric acid. The aqueous layer was rewashed with 200 mls of the solvent. The M.I.B.K. solution was dried over anhydrous magnesium sulphate to 0.9% water and the cake was washed with 450 mls of M.I.B.K. Sufficient water was added to 200 mls of 1.9N sodium ethyl hexoate in M.I.B.K. to make up the water content of the M.I.B.K. solution to 1.3%. The sodium ethyl hexoate solution was added over 1¼ hours. The precipitate was collected and added to 800 mls of n-butanol containing 16 mls of 1.9N sodium ethyl hexoate in M.I.B.K. and maintained at 80°C for 10 minutes. The solid was filtered, washed with 1800 mls of acetone and dried at 70°C for 17 hours. Yield was 80.7%; the chemical assay was 89.5% as disodium salt; moisture 1.4% and microbiological assay 81.7% as free acid.

EXAMPLE 17 a. Hydrogenation of the Benzyl Ester 440 ml of water, 2.5 g of charcoal and 75 g of 5% palladium catalyst are placed in a flask and prehydrogenated for one hour at 25°C and 5 p.s.i.g. 25 g of the benzyl ester of α-carboxy-3-thienylmethyl penicillin in 75 ml of water are added and hydrogenation continued for 1¼ hours. The spent catalyst is removed by filtration and the filter cake washed with 4 × 75 ml of water. The filtrate is cooled to 2°–5°C and extracted with M.I.B.K. (1 × 175; 2 × 50 ml) at pH 2.0. The combined extracts are cooled to 2°–5°C and washed with 43 ml of water at pH 3.5. The organic layer is dried over anhydrous magnesium sulphate and the moisture level adjusted to 0.9%. A 2N solution of sodium ethyl hexoate is added over 1 hour and the precipitate is collected, reslurried in hot isopropyl alcohol ( 70°C) and dried overnight at 60°C. The yield of disodium α-carboxy-3-thienylmethyl penicillin is 71.5% of theory. The moisture content of the product is 2.2%.

b. Hydrolysis of the Benzyl Ester 25 g of benzyl α-carboxy-3-thienylmethyl penicillin are dissolved in 625 ml of distilled water and the solution maintained at 20°C. One equivalent (44 mls) of 1.15N sodium hydroxide solution is added at pH 10.5 and the solution stirred for a further 15 mins. The reaction product is extracted at 2°–5°C with M.I.B.K. (2 × 125 ml) at pH 4.6 and the M.I.B.K. extracts discarded. The aqueous phase is further extracted at 2°–5°C with M.I.B.K. (1 × 175; 2 × 50) at pH 2.0. The bulked M.I.B.K. extracts are cooled to 2°–5°C and washed with 43 ml of water at pH 3.5. The organic layer is dried over anhydrous magnesium sulphate and the moisture level adjusted to 0.9%. A 2N solution of sodium ethyl hexoate is added over 1 hour and the precipitate is collected, reslurried in hot isopropyl alcohol (70°C) and dried overnight at 60°C. The yield of disodium α-carboxy-3-thienylmethyl penicillin is 67.5% of the theoretical value. The moisture content of the product is 2.4%.

EXAMPLE 18

α-Carboxy-3-thienylmethyl Penicillin Sodium Salt

Sodium carbonate decahydrate (340 g., 1.18 mole) was dissolved in water (12.5 l.) at room temperature (19°–24°C). To this was added α-(benzyloxycarbonyl)-3-thienylmethyl penicillin sodium salt (275 g., 0.57 mole, approx. 91% pure) and the resultant solution was stirred (1.5 hr.). The solution was cooled to 2°–5°C, dilute HCl was added to pH 4.4 (ca. 1,100 ml of 2N), and a small quantity of unhydrolyzed starting penicillin removed by extraction with 4-methylpentan-2-one (1.2 l. + 0.5l.). The aqueous phase was covered with fresh 4-methylpentan-2-one (2 l.) and the pH adjusted to 2 with dilute HCl (ca. 500 ml of 2N). The layers were separated and the aqueous layer re-extracted with further fresh 4-methylpentan-2one (750 ml). The latter 4-methylpentan-2-one extracts were combined, washed with water (500 ml), and with saturated brine (500 ml) and then dried over MgSO₄ (15 mins.). Sodium 2-ethylhexoate (650 ml of 1.96 M in 4-methylpentan-2-one) was added to the dried solution with rapid stirring. After 1 hour the precipitated product was separated on a basket centrifuge, washed with 4-methylpentan-2-one and finally stirred with isopropanol (2 l.) at 70°C (15 mins.). The product was again spun off, washed with acetone (2 l.) and dried in a vacuum oven at 50°C. Yield = 185 g., 78%.

| | |
|---|---|
| Alkalimetric purity | 91% |
| pH of a 10% solution in water | 6.75 |
| Water content (by Karl Fischer) | 2.4% |

EXAMPLE 19

α-Carboxy-3-thienylmethyl Penicillin Sodium Salt

Using the α-phenyl ester of α-carboxy-3-thienylmethyl penicillin in place of the α-benzyl ester in Example 18, the title product was obtained with similar yield and assays.

EXAMPLE 20

α-Carboxy-3-thienylmethyl Penicillin Sodium Salt

Using the tert.-butyl ester of α-carboxy-3-thienylmethyl penicillin in place of the benzyl ester in Example 18, the title product was obtained.

Figure 1:
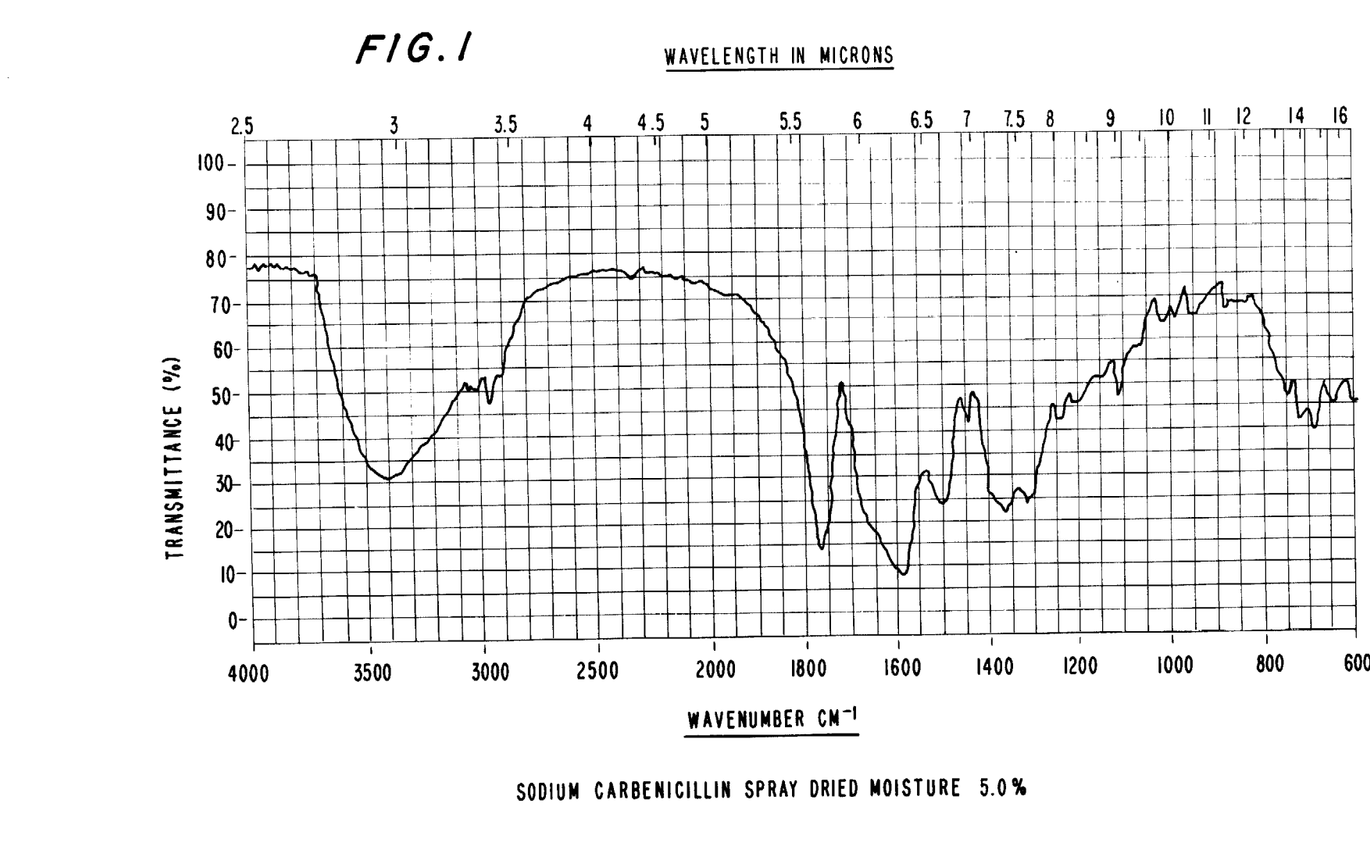
FIG. 1 is the infrared spectrum of the spray-dried product.
Figure 2:
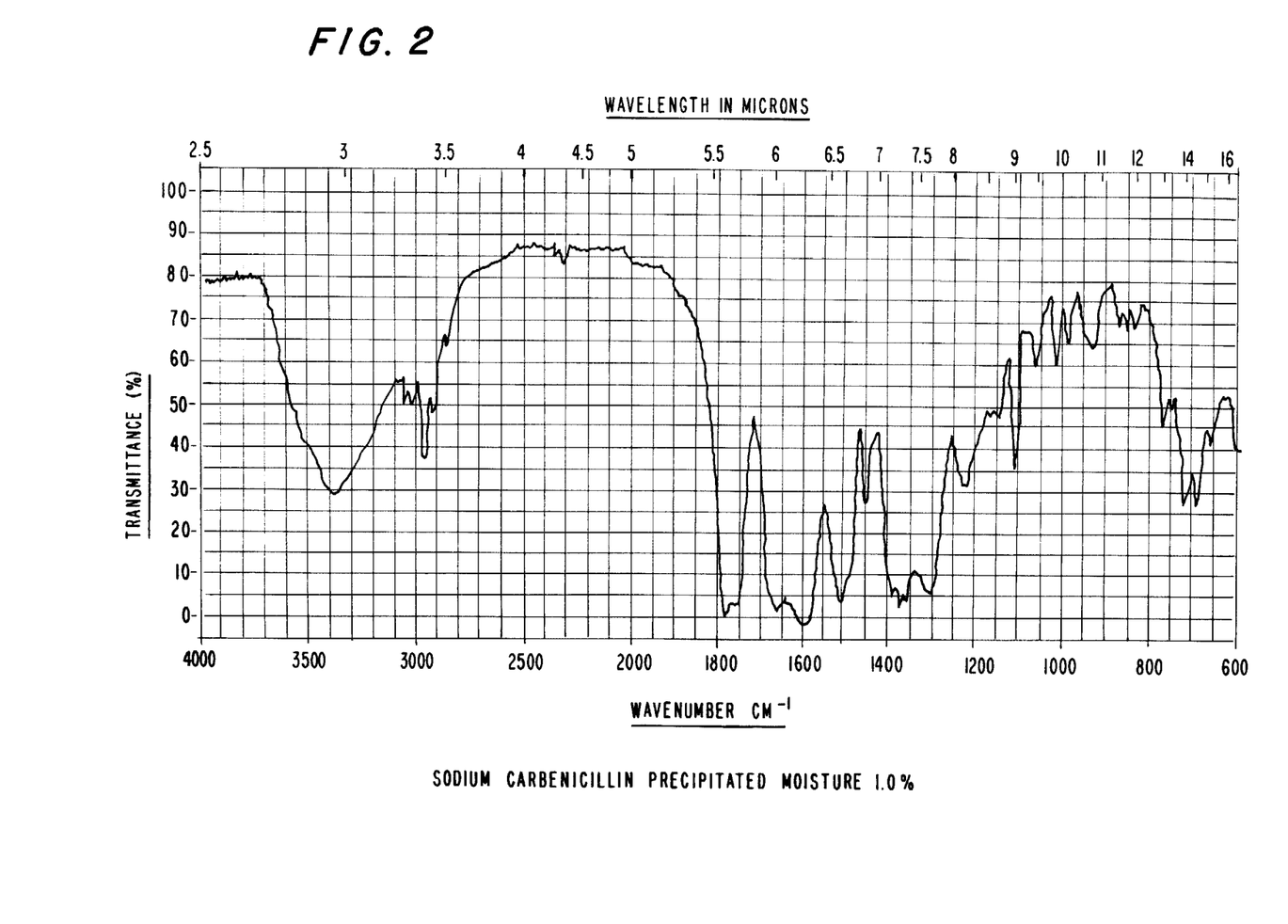
FIG. 2 is the infrared spectrum of precipitated carbenicillin of the present invention.
Figure 2A:
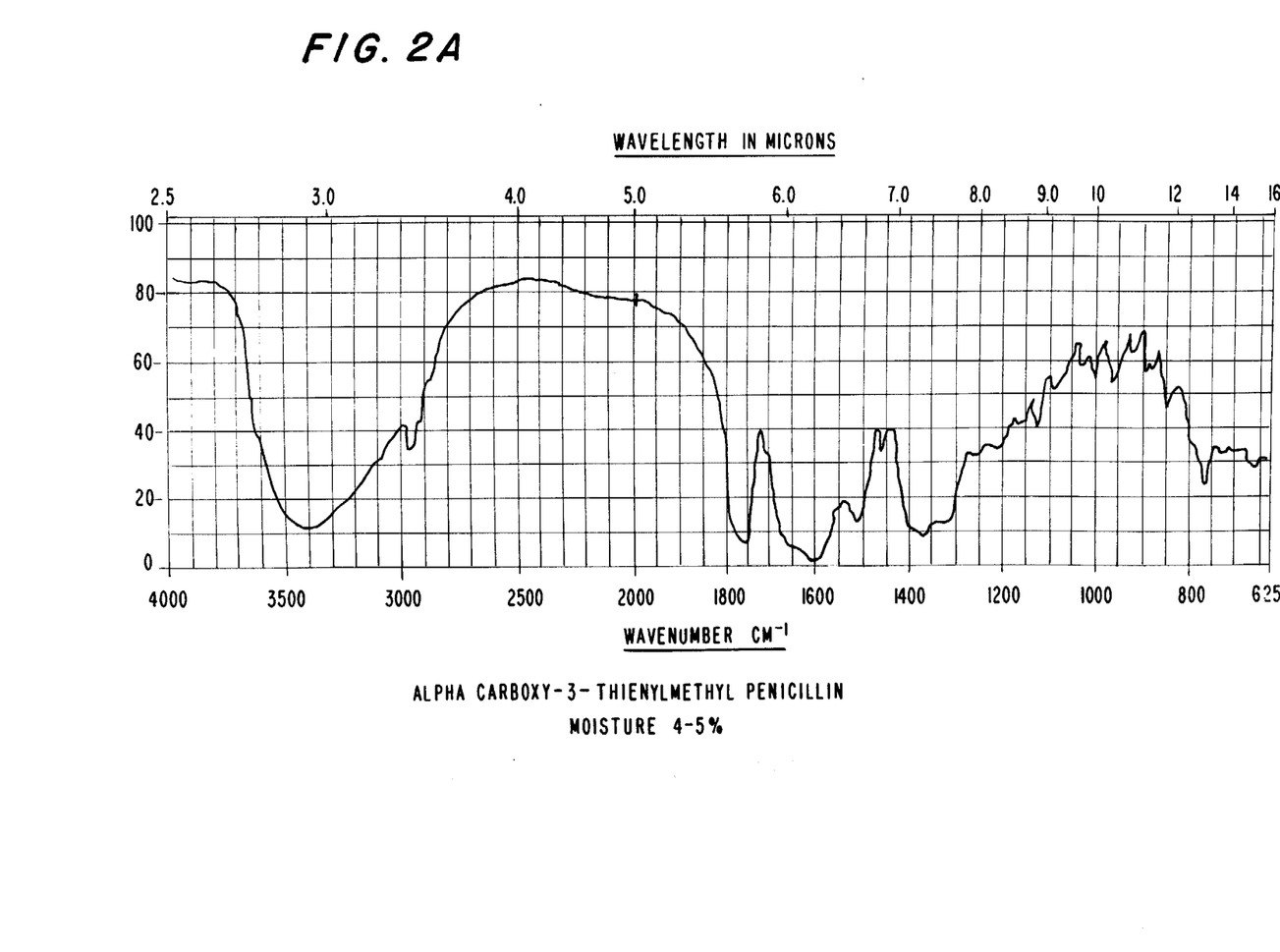
FIG. 2A is the infrared spectrum of the spray-dried thienyl compound.

What is claimed is:

1. The crystalline anhydrous di-sodium penicillin salt of the formula:

wherein R is phenyl and characterized by having the infrared spectrum of FIG. 2.

2. A process for producing the anhydrous crystalline disodium penicillin salt of claim 1, which comprises precipitating said penicillin from an organic solvent with the sodium salt of a lower aliphatic carboxylic acid as precipitant, isolating the product and purifying it by reslurrying in an organic solvent at a temperature of at least about 40°C but below the boiling point of the solvent.

3. The process of claim 2, wherein the solvent from which precipitation takes place is an aliphatic alcohol having at least 4 carbon atoms, an aliphatic ketone having at least 6 carbon atoms, or a lower aliphatic ester of acetic acid.

4. The process as in claim 3, wherein the aliphatic alcohol is n-butanol, iso-butanol, sec.-butanol or tert.-butanol.

5. The process as in claim 3, wherein the lower aliphatic ester of acetic acid is methyl acetate, ethyl acetate, propyl acetate or butyl acetate.

6. The process as in claim 3, wherein the aliphatic ketone is methyl isobutyl ketone.

7. The process as in claim 2, wherein the precipitant is sodium ethyl hexoate.

8. The process as in claim 2, wherein the precipitant is sodium ethyl butyrate.

9. The process as in claim 2, wherein the solvent in which reslurrying takes place, is n-propyl alcohol, iso-propyl alcohol, n-butanol, iso-butanol, sec.-butanol or tert.-butanol.

10. The process as in claim 2, wherein the temperature of reslurrying in the organic solvent is 40° to 85°C.

11. The process as in claim 2, wherein the temperature of reslurrying in the organic solvent is 60° to 85°C.

Figure 2B:
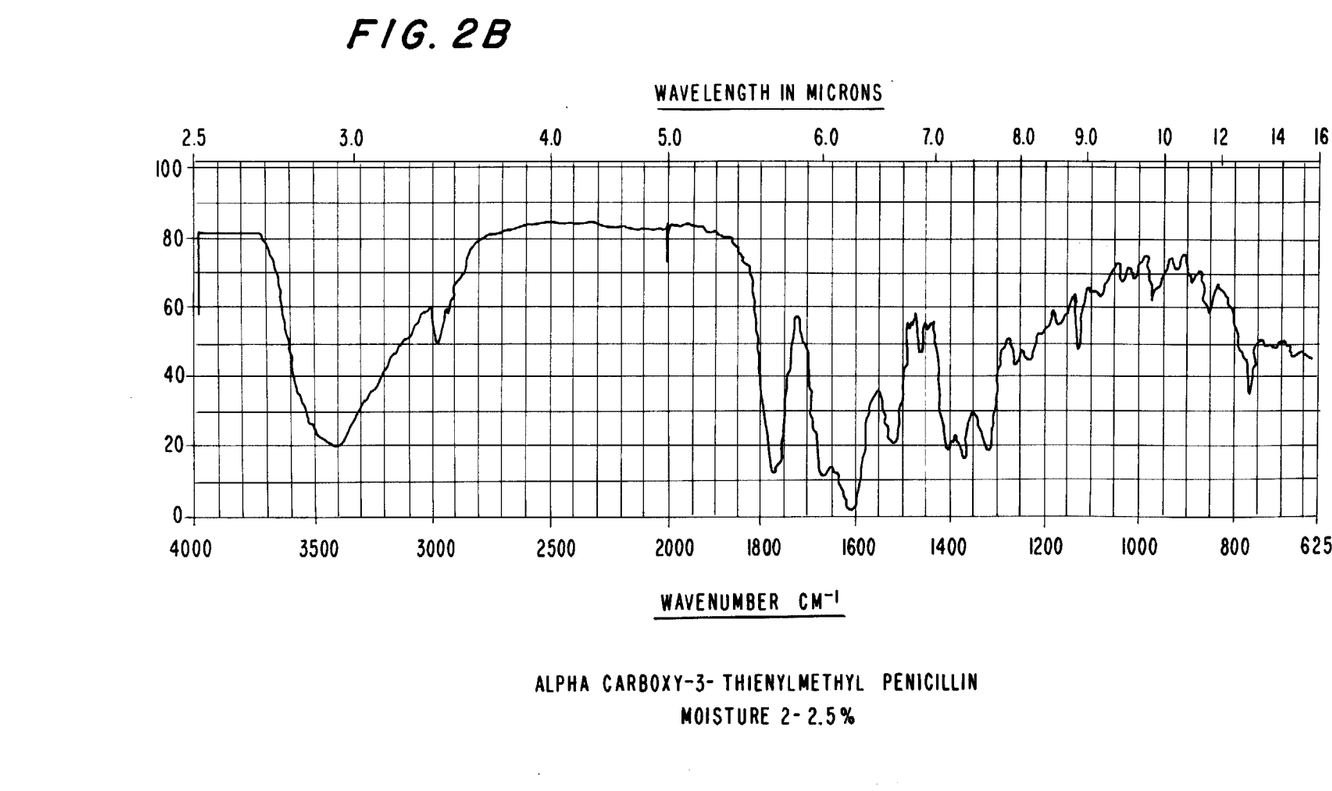
FIG. 2B is the infrared spectrum of precipitated thienyl compound of the present invention.
Figure 3:
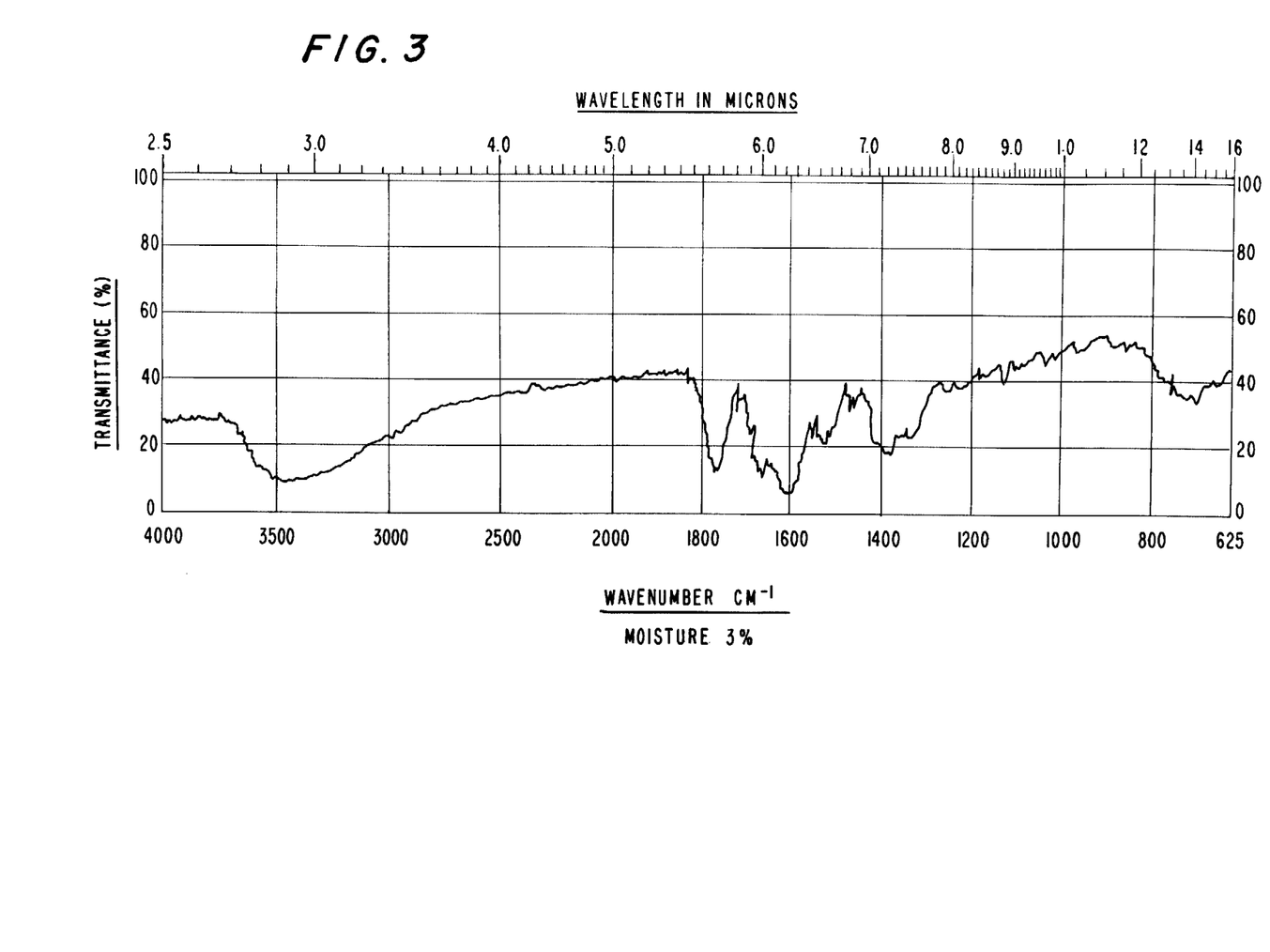
FIG. 3 is the infrared spectrum of lyophilized carbenicillin.

12. The crystalline anhydrous di-sodium penicillin salt of the formula:

wherein R is thienyl and characterized by having the infrared spectrum of FIG. 2B.

13. A process for producing the anhydrous crystalline disodium penicillin salt of claim 12, which comprises precipitating said penicillin from an organic solvent with the sodium salt of a lower aliphatic carboxylic acid as precipitant, isolating the product and purifying it by reslurrying in an organic solvent at a temperature of at least about 40°C but below the boiling point of the solvent.

* * * * *